(12) United States Patent
Emrich et al.

(10) Patent No.: US 11,593,955 B2
(45) Date of Patent: Feb. 28, 2023

(54) ROAD MAP FUSION

(71) Applicant: Harman Becker Automotive Systems GmbH, Karlsbad (DE)

(72) Inventors: Tobias Emrich, Munich (DE); Eric Theisinger, Otterbach (DE); Volodymyr Ivanov, Odelzhausen (DE); Roland Preiss, Erding (DE)

(73) Assignee: Harman Becker Automotive Systems GmbH, Karlsbad (DE)

(*) Notice: Subject to any disclaimer, the term of this patent is extended or adjusted under 35 U.S.C. 154(b) by 180 days.

(21) Appl. No.: 16/987,651

(22) Filed: Aug. 7, 2020

(65) Prior Publication Data

US 2021/0042942 A1   Feb. 11, 2021

(30) Foreign Application Priority Data

Aug. 7, 2019   (EP) .................................... 19190541

(51) Int. Cl.
| | |
|---|---|
| *G06T 7/33* | (2017.01) |
| *G06F 16/29* | (2019.01) |
| *G06T 7/181* | (2017.01) |
| *G06N 3/04* | (2006.01) |
| *G06N 3/049* | (2023.01) |

(52) U.S. Cl.
CPC .............. *G06T 7/337* (2017.01); *G06F 16/29* (2019.01); *G06N 3/049* (2013.01); *G06T 7/181* (2017.01)

(58) Field of Classification Search
CPC ..................... G06T 7/337; G06T 7/181; G06T 2207/20084; G06T 2207/20221; G06T 2207/30181; G06T 7/33; G06F 16/29; G06N 3/049; G06N 3/08; G06N 3/0445; G06N 3/0454; G06N 3/0472; G06N 3/0481; G06K 9/6268; G06K 9/6277; G09B 29/005; G06V 20/10
See application file for complete search history.

(56) References Cited

U.S. PATENT DOCUMENTS

2020/0065653 A1* 2/2020 Meier .................... G06N 3/088
2021/0089571 A1* 3/2021 Perone .................. G06F 40/216

OTHER PUBLICATIONS

Multiple People Tracking, Tang et al, 2017 (Year: 2017).*
Step by step VGG16 implementation, Thakur, Aug. 6, 2019; https://towardsdatascience.com/step-by-step-vgg16-implementation-in-keras-for-beginners-a833c686ae6c (Year: 2019).*

* cited by examiner

*Primary Examiner* — Jianxun Yang
(74) *Attorney, Agent, or Firm* — Brooks Kushman P.C.

(57) ABSTRACT

A map fusing method includes receiving a source graph and a target graph. The source graph is representative of a source map and the target graph is representative of a target map and includes nodes and edges that connect the nodes. The method further includes processing each of the source graph and the target graph in a graph convolutional layer to provide graph convolutional layer outputs related to the source graph and to the target graph, processing each of the graph convolutional layer outputs for the source graph and the target graph in a linear rectifying layer to output node feature maps related to the source graph and the target graph. The method further includes selecting pairs of node representations from the node feature maps related to the source graph and the target graph and concatenating the selected pairs to output selected and concatenated pairs of node representations.

19 Claims, 3 Drawing Sheets

ROAD MAP FUSION

CROSS-REFERENCE TO RELATED APPLICATIONS

This application claims priority to EP Patent Application No. 19190541.3 filed on Aug. 7, 2019, the disclosure of which is hereby incorporated in its entirety by reference herein.

TECHNICAL FIELD

The disclosure relates to a system and method (generally referred to as a "system") for fusing road maps.

BACKGROUND

Many applications such as areal exploration, location-based services, route planning, free parking-spot search and the like are based on digital street maps. Due to the large variety of applications, there also exists a large amount of digital street maps that differ, among other aspects, in their coverage, recording time, map generation approach, and attributes. To take advantage of all the information included in different street maps, a technique known as map fusion (also referred to as map conflation, map merging or map matching) is applied which allows to merge two or more maps into one. However, due to the large amount of information contained in the numerous maps, map fusion approaches can be time and resource consuming or inaccurate. Thus, there is a considerable interest in more efficient and accurate map fusion techniques.

SUMMARY

A map fusing method includes receiving a source graph and a target graph. The source graph is representative of a source map and the target graph is representative of a target map and includes nodes and edges that connect the nodes. The method further includes processing each of the source graph and the target graph in a graph convolutional layer to provide graph convolutional layer outputs related to the source graph and to the target graph, processing each of the graph convolutional layer outputs for the source graph and the target graph in a linear rectifying layer to output node feature maps related to the source graph and the target graph. The node feature maps include data representative of characteristic features of each node. The method further includes selecting pairs of node representations from the node feature maps related to the source graph and the target graph and concatenating the selected pairs to output selected and concatenated pairs of node representations. The method also includes processing the selected and aggregated pairs of node representations in a fully connected layer to provide a fully-connected layer output, softmax processing the fully connected layer output to output a probability of matching of nodes in the node feature maps related to the source graph and to the target graph, and determining, based on the probability of matching of nodes, whether to fuse nodes in the source map with a corresponding node in the target graph.

Other systems, methods, features and advantages will be, or will become, apparent to one with skill in the art upon examination of the following detailed description and appended figures. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As outlined above, digital street maps may differ, among other aspects, in their coverage, recording time, map generation approach, and attributes. For example, the aspect "coverage" refers not only to the area that is captured by the map, but also to the granularity (e.g. some maps may focus only on highways, while others also include smaller streets). The aspect of "recording time" is another aspect that in which, for example, the street network changes continually so that maps that capture the same area at different times will likely differ accordingly. It is noted that the same map may also have different recording times for different areas. The aspect "map generation approach" addresses the fact that some maps are generated in a rather consistent manner from mapping companies that conduct mapping surveys, while others (e.g., Open Street Map) are generated through collaborative efforts by many users, which may result in a less consistent modeling of the map. The aspect "attributes" takes into consideration that digital street maps usually include other information in addition to the pure road network. These attributes can be quite diverse and may support advanced applications that go beyond simple routing. Examples of attributes are speed limits, traffic information, free parking spots, admissible total vehicle weight, road condition and the like.

Figure 1:
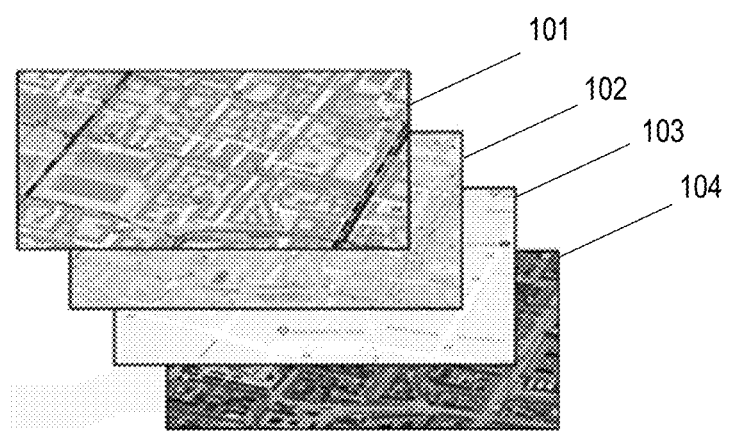
FIG. 1 is a schematic diagram illustrating a multiplicity of electronic maps of different types that are to be fused.

Referring to FIG. 1 the process of combining information from two or more maps 101-104 is known as map fusion, map conflation, map merging or map matching. By combining different information of several maps 101-104, for example, digital street maps, it is possible to increase the coverage of the resulting map, improve the quality of the input maps, correct any errors that the input maps may contain, and compile a map with the combined attributes of the input maps. The basic principle of map fusion is to match objects in a source map to the corresponding objects in the target map. Objects may be, for example, streets, intersections or points of interest. Based on the matching of these objects, information (e.g., geometry of a street, speed limits or traffic information) can be transferred from one map to another.

Figure 2:
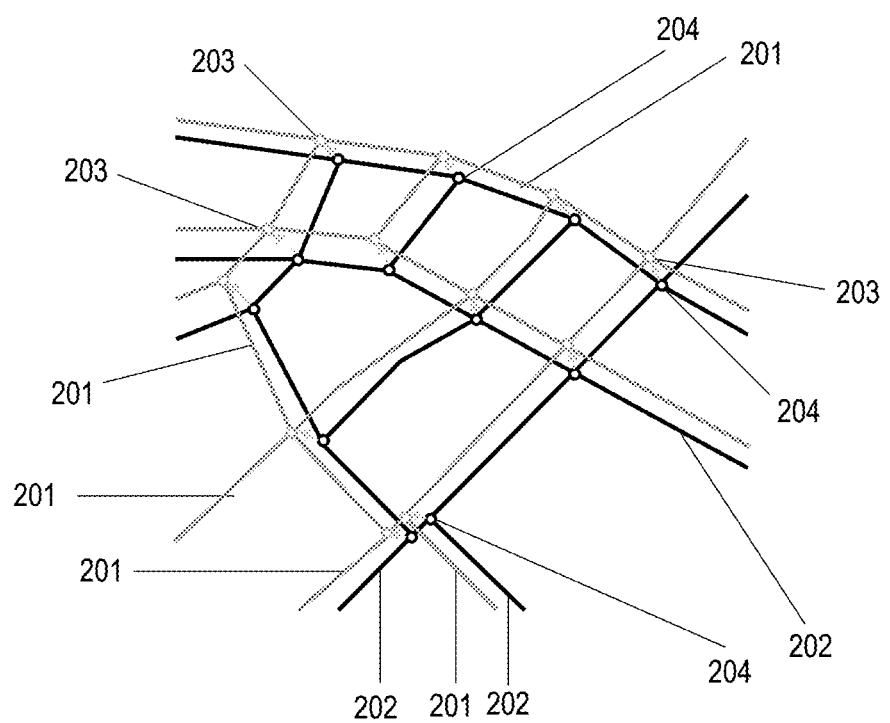
FIG. 2 is a schematic diagram illustrating the fusion of a source map with a target map by matching intersections and streets.

As depicted in FIG. 2, a road network can be represented as a graph G (V, E), i.e., as a collection of nodes V (junctions, intersections) and edges E (road segments), where each edge E connects two nodes V. In the example shown and described in connection with FIG. 2, there are a multiplicity of edges 201 and nodes 203 of a target map, to which a multiplicity of edges 202 and nodes 204 of a source map are mapped.

Figure 4:
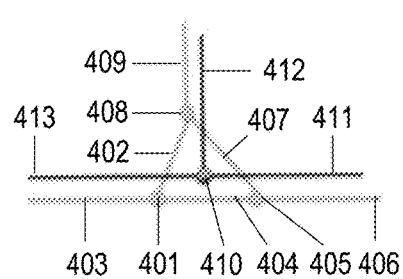
FIG. 4 is a schematic diagram illustrating a 1:m matching between intersections in the source and target road network
Figure 5:
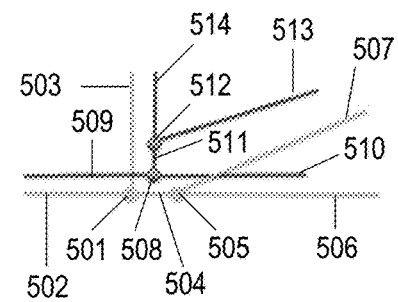
FIG. 5 is a schematic diagram illustrating a n:m matching between intersections in the source and target road network.

In the following and with reference to FIGS. 3, 4 and 5, map fusion focuses on intersections (nodes), wherein each map is, for example, a road network. Map fusion is based on a source road network S and a target road network T, where it is assumed that the source road network S and the target road network T include matching pairs (sv, tv) of source nodes sv and target nodes tv, in which sv∈S. V and tv∈T. V. A matching pair (sv, tv) exists if the source nodes sv and the target nodes tv represent the same physical intersection in the real world. It is noted that sometimes a 1:1 match between intersections (nodes) in the source and target road network is not possible due to different modeling techniques. In this case a 1:m, n:1, or n:m match may be performed. Some approaches to map fusion try to match streets or intersections of the two input maps, in which n represents the number of nodes to be matched in the source map and m represents the number of nodes to be matched in the target map.

Figure 3:
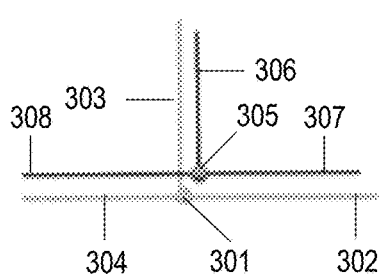
FIG. 3 is a schematic diagram illustrating a 1:1 matching between intersections in the source and target road network.

FIG. 3 depicts a 1:1 match of a source road network (map) and a target road network (map). In this example, the target road network (map) is represented by a graph which includes a node 301 at an intersection of edges 302, 303 and 304, and the source road network (map) is represented by a graph which includes a node 305 at an intersection of edges 306, 307 and 308. FIG. 4 depicts a 1:m (e.g., m=3) match of a source road network (map) and target road network (map). In this example, the target road network (map) is represented by a graph which includes nodes 401, 405 and 408. Node 401 represents an intersection of edges 402, 403 and 404. Node 405 represents an intersection of edges 404, 406 and 407. Node 408 represents an intersection of edges 402, 407 and 409. The source road network (map) is represented by a graph which includes a node 410 at an intersection of edges 411, 412 and 413. FIG. 5 depicts an n:m (e.g., n=2, m=2) match of a source road network (map) and target road network (map). In this example, the target road network (map) is represented by a graph which includes nodes 501 and 505. Node 501 represents an intersection of edges 502, 503 and 504. Node 505 represents an intersection of edges 504, 506 and 507. The source road network (map) is represented by a graph which includes nodes 508 and 512. Node 508 represents an intersection of edges 509, 510 and 511. Node 512 represents an intersection of edges 511, 513 and 514.

An exemplary algorithm for map fusion may include at least three processing phases. In a first processing phase, referred to as "candidate selection", for each object s in the target map, a set of candidate objects t from the source map is selected for which it holds that dist(s, t)<ε, where ε represents a threshold and dist( ) is usually a combined distance that is dependent on several aspects such as, for example, intersections, spatial distance, outgoing links, structure of outgoing links, etc. and aspects such as, streets, spatial distance, shape similarity, length, angle, etc.

In a second processing phase, referred to as "optimization", the distances from the first phase can be converted into scores (sometimes probabilities) that allow to decide whether two objects should be matched. Afterwards, these scores are iteratively updated based on the structure of the neighborhoods of the matching pair. The end result is a score matrix that indicates for each object pair (s, t) the likelihood that these objects will be matched.

In a third processing phase, referred to as "final selection", the final matching pairs are selected to ensure that no contradictions remain. Several examples of the above approach to the conflation processes applied to databases from heterogeneous sources exist. The term "conflation" is used to describe the procedure of integrating this different data, and conflation methods play a role in systems for updating databases, the derivation of new cartographic products, the densification of digital elevation models, automatic features extraction and so on. Each conflation process can be classified based on, for example, its evaluation measures and its main application problems. One way is to classify the conflation process on the basis of the matching criteria or the representation model. In one exemplary approach, a heuristic probabilistic relaxation road network matching method is used to integrate the available and up-to-date information of multi-source data. This method starts with an initial probabilistic matrix reflecting dissimilarities in the shapes of mapped objects and then integrates the relative compatibility coefficient of neighboring candidate pairs to iteratively update the initial probabilistic matrix until the probabilistic matrix is globally consistent. Finally, the initial 1:1 matched pairs are selected on the basis of probabilities that are calculated and refined on the basis of the structural similarity of the selected matched pairs. A matching process is then implemented to find m:n matching pairs. For example, the matching between OpenStreetMap network data and professional road network data has shown that our method is independent of matching direction and successfully matches 1:0 (Null), 1:1 and m:n pairs.

The above approaches, however, may have one or more of the drawbacks outlined below.

One drawback is an unwanted parameter dependency, as most of the approaches that fall into the above category can include a number of parameters that need to be highly tuned for road networks to be fused. Finding an optimal setting may be challenging.

Another drawback can occur during the adaptation to new scenarios. For example, when the street pattern changes (e.g., in new regions) are considered, the parameter dependency is generally not transferable, which either leads to more errors or requires dedicated parameters for each region separately.

Another drawback can be that the system cannot natively report problematic cases. Most approaches include the review of reportedly matching pairs by human annotators. However, in a productive automated environment this is highly undesirable.

Another drawback can be slow performance. The runtime complexity of the approaches outlined above is usually around $O(n^3)$ or more, which makes them impractical for large scale map fusion. A way to overcome at least some of these drawbacks is referred to herein as "learned map fusion", in which a trainable map fusion method is employed that learns from examples and adjusts its processes accordingly.

Convolution and the convolutional layer are building blocks of convolutional neural networks. A convolution is simply the application of a filter to an input that results in an activation. Repeated application of the same filter to an input results in a map of activations called a feature map, which indicates the locations and strength of a detected feature in an input, such as an image, pattern or graph. The benefit of convolutional neural networks includes the ability to automatically learn a large number of filters in parallel that are specific to a training dataset under the constraints of a specific predictive modeling problem, such as image classification. The result is highly specific features that can be detected anywhere on input images, patterns or graphs. Convolutional neural networks (CNN) apply a filter to an input to create a feature map that summarizes the presence of detected features in the input. Filters can be predetermined, but convolutional neural networks allow the filters to be learned during training in the context of a specific prediction problem.

Using a filter smaller than the input may be preferable as this aspect allows the same filter to be applied multiple times at different points of the input. Specifically, the filter is applied systematically to each overlapping part or filter-sized patch of the input data. This systematic application of the same filter across an image, pattern or graph has the effect that, if the filter is designed to detect a specific type of feature in the input, then the application of that filter systematically across the entire input image, pattern or graph allows the filter the opportunity to discover that feature anywhere in the image, pattern or graph.

The first layer in a CNN is a convolutional layer. A fully connected layer may be added at the end of the network. This layer basically takes an input volume (e.g., the output of a convolutional or rectified linear unit (ReLU) or of a pool layer preceding it) and outputs an N dimensional vector, wherein N is the number of classes that the program has to choose from. Each number in this N dimensional vector represents the probability of a certain class. CNNs are regularized versions of multilayer perceptrons. Multilayer perceptrons usually refer to fully connected networks, that is, each neuron in one layer is connected to all neurons in the next layer. The "fully connectedness" of these networks makes them prone to overfitting data. Typical ways of regularization include adding some form of magnitude measurement of weights to the loss function. However, CNNs take a different approach to regularization. For example, CNNs take advantage of the hierarchical pattern in data and assemble more complex patterns using smaller and simpler patterns. Therefore, on the scale of connectedness and complexity, CNNs are at the lower end.

Figure 6:
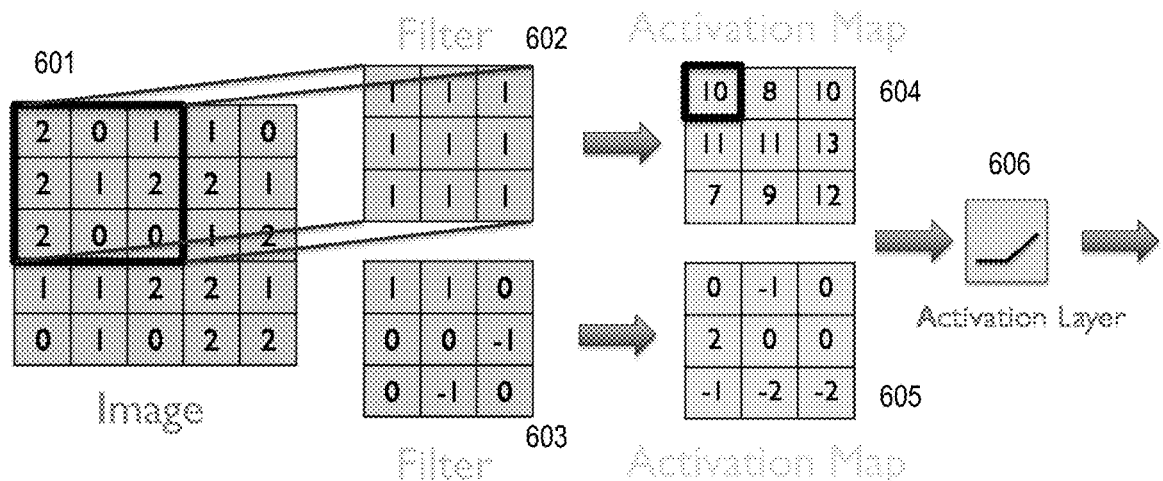
FIG. 6 is a schematic diagram illustrating an exemplary convolutional network or layer.
Figure 7:
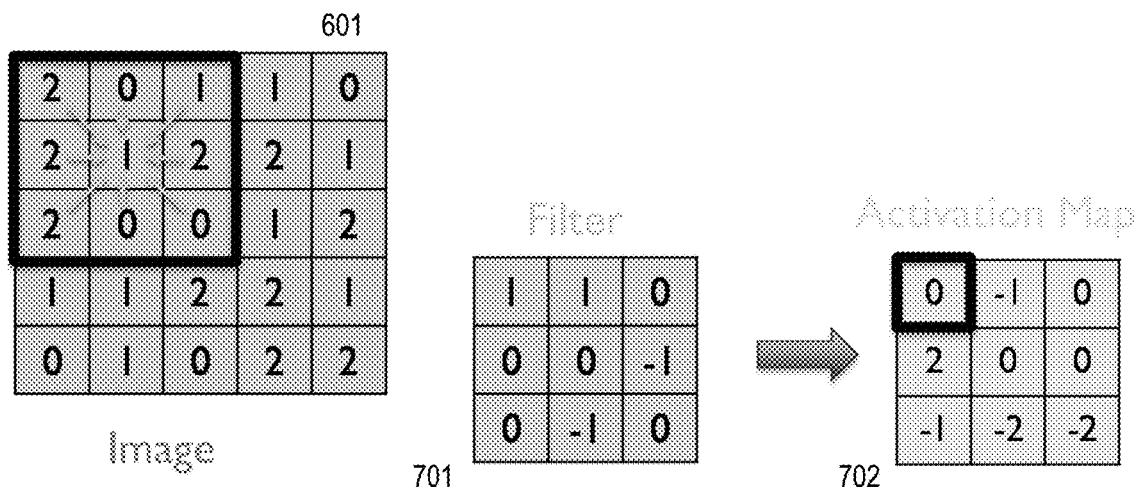
FIG. 7 is a schematic diagram illustrating another exemplary convolutional network or layer.

FIG. 6 illustrates one exemplary convolutional network or layer in accordance with the explanations above. The convolutional network or layer receives a matrix of numbers which are representative of pixels of an image 601. For the purpose of explanation, the matrix may be a 5×5 matrix but the matrix may be of any other dimension as well. One (or more) sub-matrices (in this example one 3×3 matrix) is selected and subsequently filtered by one (or more) filters 602 (and 603) to output one (or more) activation maps 604 (and 605), which can be further processed by an activation layer 606. In an alternative convolutional network or layer shown in FIG. 7, each pixel in the image 601 collects a weighted average (using filter weights of a filter 701) over the neighbors and the pixel's own value to output an activation maps 702, which can be further processed by an activation layer (not shown in FIG. 7).

Figure 8:
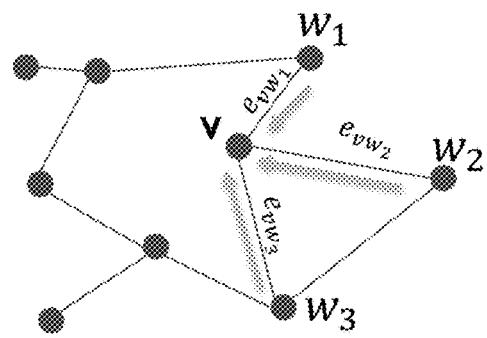
FIG. 8 is a schematic diagram illustrating an exemplary graph convolutional layer with a node being examined with regard to its neighboring nodes.

Referring to FIG. 8, a graph convolutional layer t+1 is can be described as follows: Each node v collects information $m_v^{t+1}$ from its neighbors N(v) based on the hidden states (i.e., features) $h_v^t$, $h_{N(v)}^t$ and $e_{vw}$ of the node, the neighbours and the edges between the node and its neighbors from the previous layer t, respectively:

$$m_v^{t+1} = \sum_{w \in N(v)} M_t(h_v^t, h_w^t, e_{vw}).$$

Then the hidden state of v is updated according to:

$$h_v^{t+1} + U_t = (h_v^t, m_v^{t+1}).$$

The message functions $M_t$ and update functions $U_t$ are learned differentiable functions. The nodes may have different numbers of neighbors and neighbors may have no order. Multiple layers or networks can be stacked to increase the receptive field.

An example of a graph convolutional layer that ignores edge features works as follows: Each node v collects features $h_w^t$, from its neighbors w∈N(v). In the next step, each feature representation $h_w^t$ is processed by a single layer fully connected neural network layer resulting in $h_w^n$. Then the features $h_w^n$ of all neighbors of v are summed up resulting in $m_v^{t+1}$. Then $h_v^{t+1}$ is computed by a weighted average of the aggregated neighbor information $m_v^{t+1}$ and the features $h_v^n$ of node v. Finally, the feature representation of each node computed by the described method is processed by a ReLU unit.

Figure 9:
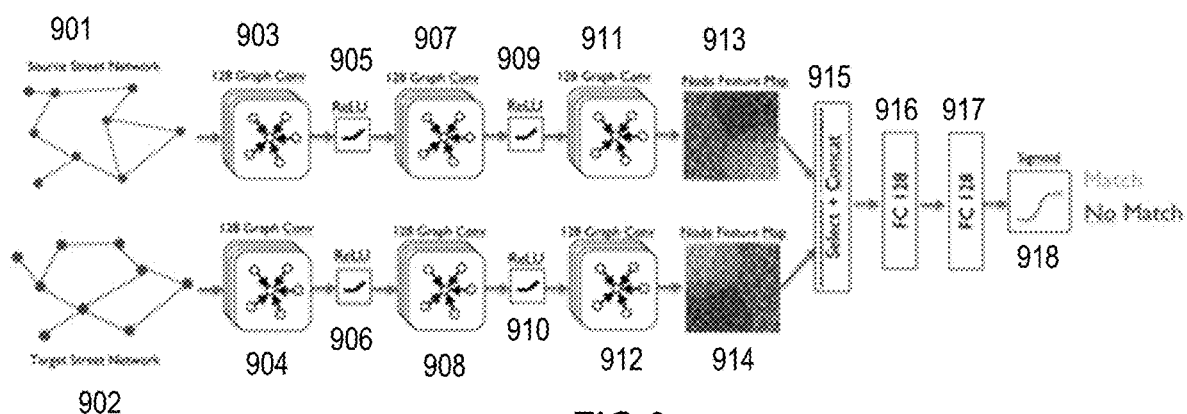
FIG. 9 is a schematic diagram illustrating graph neural network architecture for map fusion with three exemplary graph convolutional layers.

FIG. 9 depicts an architecture for a Siamese Graph Convolutional Network that allows for performing a trainable map fusion method. The training is performed based on examples, where false positives and false negatives are added to the training data that is based on examples. As shown in FIG. 9, input to this network are two street networks, a source street network 901 and a target street network 902, each represented by a respective graph with nodes (the positions of which are taken as features) representing intersections of edges (potentially with a geometry given by polylines). Each of the two graphs passes through a corresponding sequence (one or more) of graph convolutional layers 903, 904 (implemented by way of 128 graph convolutional filters) with ReLU layers 905, 906, 909, 910 in between. In the context of artificial neural networks, a ReLU corresponds to a rectifier in the analog domain and provides an activation function defined as the positive part of its expression $f(x)=x+=\max(0, x)$, where x is the input to a neuron. This is also known as a ramp function and is analogous to half-wave rectification in in the analog domain. A respective graph convolutional filter updates the features of a node by averaging the current features with the weighted features of the adjacent nodes.

The output after a series of respective graph convolutional layers 903, 904, 907, 908, 911, 912 is a node feature map 913, 914, wherein each node is represented by a 128- dimensional feature vector. Then pairs of these node representations are selected and aggregated in a selection and aggregation (e.g., concatenation) layer 915, and processed in two fully connected, subsequent layers 916, 917 followed by a softmax layer 918 to output a probability for matching. In mathematics, the softmax function, also known as "softargmax" or "normalized exponential function", is a function that takes as its input a vector of K real numbers and normalizes the input into a probability distribution consisting of K probabilities. That is, prior to applying softmax, some vector components could be negative or greater than one and might not sum up to 1 but after applying softmax each component will be in the interval (0, 1), and the components will add up to 1 so that they can be interpreted as probabilities. Furthermore, the larger input components will correspond to larger probabilities. Softmax is used, for example, in neural networks to map the non-normalized output of a network to a probability distribution over predicted output classes.

In one exemplary approach, the whole network may be trained end-to-end using labeled data. If matchings are underrepresented in the training data, the matchings may be oversampled to achieve higher accuracy.

Figure 10:
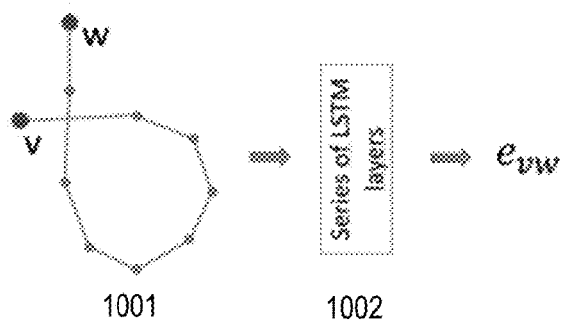
FIG. 10 is a schematic diagram illustrating learning of edge features by a long short-term memory.

The above architecture may be the basis for further extensions such as increasing the depth and width of a network 1001, and for the inclusion of edge geometries into long short-term memory (LSTM) layers 1002 as depicted in FIG. 10. LSTM is an artificial recurrent neural network (RNN) architecture used in the field of deep learning. Unlike standard feedforward neural networks, LSTM has feedback connections that make it a "general purpose computer", that is, LSTM can compute anything that a Turing machine can. It can not only process single data points, but also entire sequences of data. A common LSTM unit is composed of a cell, an input gate, an output gate and a forget gate. The cell remembers values over arbitrary time intervals and the three gates regulate the flow of information into and out of the cell. In theory, classic RNNs can keep track of arbitrary long-term dependencies in the input sequences. The problem of classic RNNs is computational (or practical) in nature: when training a classic RNN using back-propagation, the gradients that are back-propagated can "vanish" (that is, they can tend to zero) or "explode" (that is, they can tend to infinity) because of the computations involved in the process, which use finite-precision numbers. RNNs using LSTM units partially solve the vanishing gradient problem because LSTM units also allow gradients to flow unchanged.

The edge features $e_{vw}$ may also be learned by an LSTM based on their underlying geometry in the map. Specifically, the sequence of support points from node v to node w may be employed to learn these features as depicted in FIG. 10.

The method described above may be encoded as instructions for execution by a processor and stored in a computer-readable medium such as a CD ROM, disk, flash memory, RAM or ROM, an electromagnetic signal, or other machine-readable medium. Alternatively or additionally, any type of logic may be utilized and may be implemented as analog or digital logic using hardware such as one or more integrated circuits (including amplifiers, adders, delays, and filters) or one or more processors executing amplification, adding, delaying, and filtering instructions; or in software in an application programming interface (API) or in a Dynamic Link Library (DLL), as functions available in a shared memory or defined as local or remote procedure calls; or as a combination of hardware and software.

The method may be implemented by software and/or firmware stored on or in a computer-readable medium, machine-readable medium, propagated-signal medium, and/or signal-bearing medium. The medium may comprise any device that contains, stores, communicates, propagates, or transports executable instructions for use by or in connection with an instruction executable system, apparatus, or device. The machine-readable medium may selectively be, but is not limited to, an electronic, magnetic, optical, electromagnetic, or infrared signal or a semiconductor system, apparatus, device, or propagation medium. A non-exhaustive list of examples of machine-readable medium includes: a magnetic or optical disk, a volatile memory such as a Random Access Memory "RAM," a Read-Only Memory "ROM," an Erasable Programmable Read-Only Memory (i.e., EPROM) or Flash memory, and an optical fiber. A machine-readable medium may also include a tangible medium on which executable instructions are printed, as the logic may be electronically stored as an image or in another format (e.g., through an optical scan), then compiled, and/or interpreted or otherwise processed. The processed medium may then be stored in a computer and/or machine memory.

The systems may include additional or different logic and may be implemented in many different ways. A controller may be implemented as a microprocessor, microcontroller, application specific integrated circuit (ASIC), discrete logic, or a combination of other types of circuits or logic. Similarly, memories may be DRAM, SRAM, Flash, or other types of memory. Parameters (e.g., conditions and thresholds) and other data structures may be separately stored and managed, may be incorporated into a single memory or database or may be logically and physically organized in many different ways. Programs and instruction sets may be parts of a single program, separate programs or distributed across several memories and processors.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices. The described methods and associated actions may also be performed in various orders in addition to the order described in this application, in parallel, and/or simultaneously. The described systems are exemplary in nature and may include additional elements and/or omit elements.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects.

While various embodiments of the invention have been described, it will be apparent to those of ordinary skilled in the art that many more embodiments and implementations are possible within the scope of the invention. In particular, the skilled person will recognize the interchangeability of various features from different embodiments. Although these techniques and systems have been disclosed in the context of certain embodiments and examples, it will be understood that these techniques and systems may be extended beyond the specifically disclosed embodiments to other embodiments and/or uses and obvious modifications thereof While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A map fusing method comprising:
   receiving a source graph and a target graph, the source graph being representative of a source map and the target graph being representative of a target map, and comprising nodes and edges that connect the nodes;
   processing each of the source graph and the target graph in a convolutional layer to provide convolutional layer outputs related to the source graph and the target graph;
   processing each of the convolutional layer outputs for the source graph and the target graph in a linear rectifying layer to output node feature maps related to the source graph and the target graph, the node feature maps comprising data representative of characteristic features of each node;
   selecting pairs of node representations from the node feature maps related to the source graph and the target graph, and aggregating the selected pairs to output selected and aggregated pairs of node representations;
   processing the selected and aggregated pairs of node representations in a fully connected layer to provide a fully connected layer output;
   softmax processing the fully connected layer output to output a probability of matching of nodes in the node feature maps related to the source graph and the target graph;
   determining, based on the probability of matching of nodes, whether to fuse nodes in the source map with a corresponding node in the target graph; and
   processing the source graph and the target graph hierarchically, starting from the most stable nodes and moving down the edges hierarchically.

2. The method of claim 1, wherein each node of the node feature maps is represented by a node feature vector, the node feature vector comprising the data representative of characteristic features of each node.

3. The method of claim 1 further comprising at least one additional convolutional layer and at least one additional linear rectifying layer subsequent to the convolutional layer and the linear rectifying layer for processing each of the source graph and the target graph to output node feature maps related to the source graph and the target graph.

4. The method of claim 1 further comprising at least one additional fully connected layer subsequent to the fully connected layer for processing the selected and aggregated pairs of node representations in a fully connected layer to provide a fully connected layer output.

5. The method of claim 1, wherein the convolutional layers comprise weights and the weights are self-learning.

6. The method of claim 5, wherein the weights are trained end-to-end using labeled data as training data.

7. The method of claim 6, wherein, in response to matchings being underrepresented in the training data, the matchings are oversampled.

8. The method of claim 1 further comprising long short-term memory layers for processing each of the source graph and the target graph to output edge feature maps related to the source graph and the target graph, the edge feature maps comprising data representative of characteristic features of each edge.

9. The method of claim 8, wherein each edge of the edge feature maps is represented by an edge feature vector, the edge feature vector comprising the data representative of characteristic features of each edge.

10. The method of claim 8, wherein edge features are learned in the long short-term memory layers from an underlying geometry in the source graph and the target graph.

11. The method of claim 10, wherein learning the edge features is based one or more sequences of support points from one node to another node.

12. A computer-program product embodied in a non-transitory computer read-able medium that is programmed for providing map fusing, the computer-program product being executed by a processor, the computer-program product comprising instructions for:
    receiving a source graph and a target graph, the source graph being representative of a source map and the target graph being representative of a target map, and comprising nodes and edges that connect the nodes;
    processing each of the source graph and the target graph in a convolutional layer to provide convolutional layer outputs related to the source graph and the target graph;
    processing each of the convolutional layer outputs for the source graph and the target graph in a linear rectifying layer to output node feature maps related to the source graph and the target graph, the node feature maps comprising data representative of characteristic features of each node;
    selecting pairs of node representations from the node feature maps related to the source graph and the target graph, and aggregating the selected pairs to output selected and aggregated pairs of node representations;
    processing the selected and aggregated pairs of node representations in a fully connected layer to provide a fully connected layer output;
    softmax processing the fully connected layer output to output a probability of matching of nodes in the node feature maps related to the source graph and the target graph;
    determining, based on the probability of matching of nodes, whether to fuse nodes in the source map with a corresponding node in the target graph; and
    processing the source graph and the target graph hierarchically, starting from the most stable nodes and moving down the edges hierarchically.

13. The computer program product of claim 12 wherein each node of the node feature maps is represented by a node feature vector, the node feature vector comprising the data representative of characteristic features of each node.

14. The computer program product of claim 12 further comprising instructions for processing each of the source graph and the target graph to output node feature maps related to the source graph and the target graph via at least one additional convolutional layer and at least one additional linear rectifying layer subsequent to the convolutional layer and the linear rectifying layer.

15. The computer program product of claim 12 further comprising instructions for processing the selected and aggregated pairs of node representations in a fully connected layer to provide a fully connected layer output via at least one additional fully connected layer subsequent to the fully connected layer.

16. The computer program product of claim 12, wherein the convolutional layers comprise weights and the weights are self-learning.

17. The computer program product of claim 16, wherein the weights are trained end-to-end using labeled data as training data.

18. The computer program product of claim 17, wherein, in response to matchings being underrepresented in the training data, the matchings are oversampled.

19. A map fusing method comprising:
receiving a source graph and a target graph, the source graph being representative of a source map and the target graph being representative of a target map, and comprising nodes and edges that connect the nodes;
processing each of the source graph and the target graph in a convolutional layer to provide convolutional layer outputs;
processing each of the convolutional layer outputs for the source graph and the target graph in a linear rectifying layer to output node feature maps related to the source graph and the target graph, the node feature maps comprising data representative of characteristic features of each node;
selecting pairs of node representations from the node feature maps and aggregating the selected pairs to output selected and aggregated pairs of node representations;
processing the selected and aggregated pairs of node representations in a fully connected layer to provide a fully connected layer output;
softmax processing the fully connected layer output to output a probability of matching of nodes in the node feature maps related to the source graph and the target graph;
determining, based on the probability of matching of nodes, whether to fuse nodes in the source map with a corresponding node in the target graph; and
processing the source graph and the target graph hierarchically, starting from the most stable nodes and moving down the edges hierarchically.

* * * * *